United States Patent [19]

Pike

[11] 3,909,481

[45] Sept. 30, 1975

[54] OXIDATIVELY STABLE MODIFIED POLYPHENYLQUINOXALINE RESIN

[75] Inventor: Roscoe A. Pike, Simsbury, Conn.

[73] Assignee: United Technologies Corporation, Hartford, Conn.

[22] Filed: Dec. 18, 1974

[21] Appl. No.: 533,915

[52] U.S. Cl. .................. 260/37 N; 260/50; 260/823
[51] Int. Cl.² .......................................... C08L 61/20
[58] Field of Search .................... 260/37 N, 50, 823

[56] References Cited
UNITED STATES PATENTS

3,792,017  2/1974  Arnold et al. ..................... 260/50 X
3,852,243  12/1974  Hergenrother ...................... 260/50

*Primary Examiner*—Lewis T. Jacobs
*Attorney, Agent, or Firm*—John D. Del Ponti

[57] ABSTRACT

There is described an oxidatively stable resin consisting essentially of a heat cured mixture of polyphenylquinoxaline resin and polyquinoxaline resin containing 1–10%, by weight, of a dispersed finely divided particulate filler material selected from the group consisting of silica, alumina and graphite, the weight ratio of polyphenylquinoxaline resin to polyquinoxaline resin ranging from approximately 1.9 to 19. The resin may be reinforced with high strength filaments.

10 Claims, 5 Drawing Figures

Fig. 4

WEIGHT LOSS AT 650°F IN AIR (CIRCULATING AIR OVEN) MODIFIED PPQ-BORSIC COMPOSITES

○ PPQ(80), PQ(20)-SiO$_2$
× PPQ(80), PQ(20)-SiO$_2$
● PPQ(90), PQ(10)-SiO$_2$
△ PPQ(65), PQ(35)-SiO$_2$

Fig. 5

WEIGHT LOSS AT 700°F IN AIR (100 cc/min) MODIFIED PPQ-BORSIC COMPOSITES

△ PPQ(65), PQ(35)-SiO$_2$
○ PPQ(80), PQ(20)-SiO$_2$
× PPQ(80), PQ(20)-SiO$_2$
● PPQ(90), PQ(10)-SiO$_2$
□ BORSIC-P1709/700

3,909,481

OXIDATIVELY STABLE MODIFIED POLYPHENYLQUINOXALINE RESIN

BACKGROUND OF THE INVENTION

This invention relates to a polyphenylquinoxaline resin system and more particularly to a curable modified polyphenylquinoxaline resin system which is oxidatively stable after exposure to elevated temperatures.

Temperature requirements for advanced resin composite hardware in gas turbine engines are forecast to extend from the current 400°F level to at least 700°F. New resin systems beyond current polyimides are required to meet this goal. As the oxidative stability requirements for resin matrix composites become increasingly more demanding, the number of resin candidates decreases markedly. This is particularly evident when processibility of the resin is taken into consideration.

High temperature polymers when reinforced with high strength fibers offer considerable weight savings as structural components in aerospace applications when compared to metal parts. Polyphenylquinoxalines (PPQ), one of the new advanced high temperature heterocyclic resin systems, are of interest for use as a composite matrix resin because of the simple polymerization reactions involved and because of its fabricability. PPQ resins have been found to be considerably less sensitive to changes in fabrication parameters than state-of-the-art polyimides during molding of high quality laminates. Unfortunately, currently available PPQ resins when reinforced with fibers such as graphite or boron have not exhibited the degree of oxidative stability at 650°–700°F which would warrent their selection over a stable polyimide.

SUMMARY OF THE INVENTION

An object of the present invention is to provide a novel modified heat-cured polyphenylquinoxaline system which has excellent oxidative stability in the 650°–700°F temperature range, is readily formable from commercially available materials and can be molded into low void content fiber-reinforced composites using pressures in the 200–250 psi range.

In general, the present invention contemplates an oxidatively stable resin system consisting essentially of the cyclicized reaction product of polyphenylquinoxaline polymer and polyquinoxaline polymer containing 1–10%, by weight, of a dispersed, finely divided particulate filler selected from the group consisting of silica, alumina and graphite, the weight ratio of polyphenylquinoxaline polymer to polyquinoxaline polymer ranging from approximately 1.9 to 19. In a preferred form, the mixture contains 3–7 weight percent fume silica and the weight ratio of polyphenylquinoxaline polymer to polyquinoxaline polymer ranges from approximately 4 to 9.

The invention also contemplates a polymer which is suitable for conversion into an oxidatively stable resin consisting essentially of the reaction product of (1) at least one aromatic bis o-diamine selected from the group consisting of 2,3,7,8-tetra aminophenazine, 3,3'-diaminobenzidine, 3,3',4,4'-tetra aminobenzophenone, 3,3',4,4'-tetra aminodiphenylsulfone, 3,3',4,4'-tetra aminodiphenylmethane, 3,3',4,4'-tetra aminodiphenyl ether, 2,3,5,6-tetra aminobenzene and 2,3,7,8-tetra aminobenzofuran, (2) at least one aromatic bis glyoxal selected from the group consisting of p,p'-oxybis phenyleneglyoxal, p,p'-phenylene diglyoxal, p,p'-diphenyletherdiglyoxal, p,p'-diphenylsulfidediglyoxal and p,p'-diphenylsulfonediglyoxal, (3) at least one bis phenyl-α-dicarbonyl selected from the group consisting of 1,4-bisphenylglyoxalyl benzene, 1,3-bisphenylglyoxalyl benzene, 4,4'-oxydibenzil, 4,4'-dibenzilsulfide and 4,4'-dibenzilsulfone, and (4) 1–10%, by weight, of a dispersed, finely divided particulate filler selected from the group consisting of silica, alumina and graphite, the amount of aromatic bis o-diamine being essentially equimolar with respect to the total amount of aromatic bis glyoxal and bis phenyl-α-dicarbonyl.

Although there may be some variation from equimolar in the ratio of the bis o-diamine to the total bis glyoxal and bis phenyl-α-diacarbonyl, such variation is relatively small. The term "essentially equimolar" is meant to define such variation and is intended to cover a ratio range of approximately 0.98 to 1.02. The finely divided filler has a surface area of approximately 100–350 m$^2$/gm (BET), preferably 225–250 m$^2$/gm (BET) and a particle size of approximately 2–20 mµ, preferably 7–12 mµ.

BRIEF DESCRIPTION OF THE DRAWINGS

An understanding of the invention will become more apparent to those skilled in the art by reference to the following detailed description when viewed in light of the accompanying drawings, wherein.

DESCRIPTION OF THE PREFERRED EMBODIMENTS

The curable composition of the present invention comprises the reaction product of polyphenylquinoxaline polymer and polyquinoxaline polymer containing 1–10%, by weight, of a finely divided filler selected from the group consisting of fume silica, alumina and graphite dispersed throughout, the weight ratio of the polyphenylquinoxaline to the polyquinoxaline ranging from approximately 1.9 to 19, preferably 4 to 9.

By polyquinoxaline polymer is meant a polymer comprising recurring quinoxaline groups which is the reaction product of an aromatic tetramine compound containing two sets of ortho-amine functions attached to the aromatic nucleus and a diglyoxal-type tetracarbonyl compound having two terminal groups of the structure wherein R and $R_2$ are selected from the group consisting of hydrogen and monovalent hydrocarbon groups. Examples thereof and a process for producing the same are disclosed in U.S. Pat. No. 3,661,850, the teachings of which are incorporated herein by reference.

By polyphenylquinoxaline polymer is meant a polymer comprising recurring quinoxaline groups which is the reaction product of an aromatic tetramine compound containing two sets of ortho-amine functions attached to the aromatic nucleus and an aromatic bis benzil-type [phenyl substituted bis (1,2-dicarbonyl) compound] tetra carbonyl compound having two terminal groups of the structure wherein R is a phenyl or substituted phenyl. Examples thereof and a process for producing the same are set forth in the literature, e.g., Hedberg and Arnold, "Polyphenylquinoxalines with High Glass Transition Temperatures Via Highly Fused Aromatic Tetraamines", J. Poly. Sci. 12 1925 (1974); Hergenrother, "Exploratory Development Leading to Improved Polyphenylquinoxaline Polymers", Technical Report AFML-TR-73-68, May 1973; J. Appl. Poly. Sci. 18 1779 (1974) and Serafine, Delvigs and Vannucci, "In Situ Polymerization of Monomers for polyphenylquinoxaline/Graphite Fiber Composites", 29th Ann. Tech. Conf., Reinforced Plastics/Composites Institute SPI, Feb. 1974, all of which are herein incorporated by reference.

In general, the fillers useful in he present invention are finely divided particulates of the size and type as those used in rubber compounding. Silica, alumina and graphite (carbon black) are suitable and should, for example, have a surface area of approximately 100–350 $m^2/gm$ (BET), preferably 225–250 $m^2/gm$ (BET) and a particle size of approximately 2–20 m$\mu$, preferably 7–12 m$\mu$. The resin, as indicated hereinbefore, may be used for structural applications as a matrix material for high strength reinforcing fibers such as carbon, silicon carbide-coated boron, boron, silicon carbide, glass, alumina or the like, or it may be used without reinforcement in various high temperature applications, e.g., as an adhesive, as a seal or bearing (particularly with the incorporation of a dispersed lubricant) of as an ablative shield.

Rather than reacting the separate polymers of PPQ and PQ, whether commercially obtained or prepared in the laboratory, it is considered satisfactory to directly prepare a polymer suitable for conversion to an oxidatively stable resin by reacting in a suitable solvent such as n-methyl pyrrolidone or m-cresol (1) at least one aromatic bis o-diamine selected from the group consisting of 2,3,7,8-tetra aminophenazine, 3,3'-diaminobenzidine, 3,3',4,4'-tetra aminobenzophenone, 3,3',4,4'-tetra aminodiphenylsulfone, 3,3',4,4'-tetra aminodiphenylmethane, 3,3',4,4'-tetra aminodiphenyl ether, 2,3,5,6-tetra aminobenzene and 2,3,7,8-tetra aminobenzofuran, (2) at least one aromatic bis glyoxal selected from the group consisting of p,p'-oxybis phenyleneglyoxal, p,p'-phenylene diglyoxal, p,p'-diphenyletherdiglyoxal, p,p'-diphenylsulfidediglyoxal and p,p'-diphenylsulfonediglyoxal, (3) at least one bis phenyl-α-dicarbonyl selected from the group consisting of 1,4-bisphenylglyoxalyl benzene, 1,3-bisphenylglyoxalyl benzene, 4,4'-oxydibenzil, 4,4'-dibenzilsulfide and 4,4'-dibenzilsulfone, and (4) 1–10%, by weight, of the finely divided filler selected from the group consisting of fume silica, alumina and graphite, the amount of aromatic bis o-diamine being essentially equimolar with respect to the total amount of aromatic bis glyoxal and bis phenyl-α-dicarbonyl.

In one investigation, selected polyphenylquinoxaline resins were studied to obtain high temperature stability data as well as fabrication conditions for the production of low void, quality systems. In the conduct of the experiments, both linear and cross-linked polyphenylquinoxaline resins were utilized as obtained commercially from Whittaker Corp., and as modified. The PPQ resins and modifications were reinforced with both BORSIC (4.2 mil boron filaments having a thin coating of silicon carbide theron commercially available from Composite Materials Corporation) and Modmor-II graphite fibers (8.1 micron graphite fibers in 10,000 filament tows, commercially available from Morganite Modmor Inc.). In addition, state-of-the-art polyimide resin systems were used as control composites. Weight loss, short beam shear and flexural strength measurements were employed to characterize each resin/reinforcement system at temperatures up to 750°F in air.

The materials used during the investigation were broken down into composite types as follows:

Composite A — cross-linked 401 PPQ resin reinforced with Modmor-II graphite prepreg tape supplied by Whittaker Corp. (26 w/o cross-link).

Composite B — cross-linked 401 PPQ resins reinforced with BORSIC filaments obtained as a prepreg tape supplied by Whittaker Corp. (34 w/o cross-link).

Composite C — linear 401 PPQ resin supplied by Whittaker Corp. and fabricated into a BORSIC fiber-reinforced prepreg tape.

Composite D — PQ and $SiO_2$ modified 401 PPQ resin reinforced with either BORSIC fiber for Modmor-II graphite fiber and fabricated into prepreg tapes.

Composite E — polyimide resins P13N obtained from Ciba-Geigy and Skybond 709 from Monsanto. These resins were reinforced with Modmor-II fiber or BORSIC fiber to make prepregs.

The commercially available 401 PPQ resin is a polymeric compound formed by the reaction of 3,3'-diaminobenzidine and p,p'-oxydibenzil. The PQ resin used was a polymeric compound formed by the reaction of 3,3'-diaminobenzidine and p,p'-oxybis (phenyleneglyoxal hydrate).

In order to fabricate the prepreg tapes made of 4.2 mil BORSIC fiber and the selected PPQ resin, 3 inch wide by 54 inch long strips containing 208 ends of BORSIC fiber per inch on a 104 style glass scrim cloth carrier was drum wound and coated with resin by brush application. A total of three coats of resin was applied and the resulting tape was then vacuum desolvated to remove m-cresol solvent at 120°–140°F. After desolvation, the tape contained 11–12 weight percent volatiles.

During the course of experimentation, it became evident that composite fabrication technique plays a strong role in the minimization of oxidative weight loss in PPQ systems. Using the Composite A and Composite C systems, for example, it was found that one of the main factors which determines the degree of oxidative weight loss at elevated temperatures is the amount of residual solvent (m-cresol) which remains in the composite after molding. The acidic solvent causes excessive decomposition of the resin at high temperatures, as well as loss in weight by volatilization. For example, a composite of the A type which was molded by "bumping" the press (sequentially releasing and reapplying pressure) during a temperature rise from 550° to 650°F followed by press curing at 750°F had a weight loss of 5.5% in 24 hours at 650°F in air after postcure. On the other hand, a composite fabricated employing a compression molding-vacuum bag technique had a weight loss of only 0.8% for the same aging period. Similarly, a composite of the C type showed a decrease in weight loss from 3.0% to 0.45% during aging when the latter fabrication method was adopted. To minimize oxidative weight loss, a combined vacuum bag-compression technique gives best results. For PPQ and PPQ-modified composites, the following cycle gave best results: (1) Insert the mold containing the ply lay-up into a SEN-PAK vacuum bag, seal and insert the bag into a 550°F preheated press. Apply full vacuum (e.g., 1–5 mm. Hg) and contact pressure; (2) Heat to 650°F over a 30 minute period; (3) Apply pressure (200 to 1,000 psi, preferably 500 psi); (4) Heat to 750°F over a 30 minute period and hold at 750°F for 4 hours; and (5) Cool to 350°F before releasing vacuum and pressure.

Fabrication of the cross-linked PPQ-BORSIC (Composite B) required a higher molding temperature. After reaching 750°F, pressure was applied followed by an increase in temperature to 850°F which was held for four hours.

Physical properties of representative composites fabricating using the above procedure for each of the various types of PPQ systems are shown in the following Table I.

TABLE I

PHYSICAL PROPERTIES OF PPQ RESIN COMPOSITES

| Property | Graphite reinforced PPQ (Type A) | BORSIC reinforced PPQ (Type B) | BORSIC reinforced PPQ (Type C) | BORSIC reinforced 80 PPQ:20 PQ-7 w/o SiO$_2$ (Type D) |
|---|---|---|---|---|
| Fiber content, v/o | 45.0 | 47.0 | 57.0 | 58.2 |
| Resin content, v/o | 54.0 | 45.1 | 34.2 | 30.5 |
| Void content, v/o | 1.0 | 2.8 | 1.5 | 2.36 |
| Scrim cloth, v/o | — | 5.1 | 7.3 | 8.94 |
| Density, g/cc | 1.44 | 1.92 | 2.11 | 2.14 |

The PPQ resin systems have been found to be readily processed at pressures as low as 300 psi and at temperatures ranging from 750°F to 900°F. The time and temperature for pressure application can vary over a reasonable range without sacrifice in composite properties. These resin systems were found to be considerably less sensitive to changes in molding parameters than state-of-the-art polyimide resins. Composites prepared from systems A (cross-linked PPQ-Modmor-II), C (linear PPQ-BORSIC) and D (modified PPQ) required postcures in inert atmospheres to eliminate the thermoplasticity of the resin matrix at 600° to 700°F during composite testing. System B (cross-linked PPQ-BORSIC), because of a higher cross-link density than in A, required no additional postcuring after molding.

Short beam shear strengths at room temperature, 600°, 700° and 750°F of the molded composites were used as the primary critera for determining postcure requirements on the various PPQ composites. Table II lists the shear strengths of representative composites described above.

Table II

SHORT BEAM SHEAR STRENGTHS OF PPQ RESIN COMPOSITES POSTCURED IN ARGON

| Resin Type | Status | Short Beam Shear Strength, psi[a] | | | |
|---|---|---|---|---|---|
| | | RT | 600°F | 700°F | 750°F |
| Graphite reinforced PPQ (Type A) | As fabricated postcured | 14,600[b] | 4,800[c] | 3,000[c] | — |
| | 24 hrs., 750°F | 8,000[b] | 6,000[c] | 3,500[c] | — |
| | Postcured 50 hrs, 750°F | 6,000[b] | — | 5,900[b] | 3,700[c] |
| | Postcured 100 hrs, 750°F | 8,000[b] | — | 6,500[b] | 6,100[b] |
| | Postcured 24 hrs, 800°F | 4,700[b] | — | 4,100[b] | — |
| BORSIC reinforced PPQ (Type B) | As-fabricated | 12,300[b] | 6,500[b] | 4,300[b] | 3,000[b] |
| BORSIC reinforced PPQ (Type C) | Postcured 24 hrs, 750°F | 14,000[b] | 5,400 | 1,900[c] | — |
| | Postcured 50 hrs, 750°F + 21 hrs at 800°F | 13,000[b] | — | 2,250[c] | 1,850[c] |
| | Postcured 24 hrs, 850°F | 13,000[b] | — | 5,100[c] | 3,200[c] |
| BORSIC reinforced 80 PPQ:20 PQ-7 w/o SiO$_2$ (Type D) | As-fabricated | 13,800[d] | — | 1,720[d] | 1,580[d] |
| | Postcured 24 hrs, 730°F | 11,000 | — | 3,000 | 2,800 |

[a]All test samples soaked at temperature 25 minutes prior to test. S.D = 5/1
[b]Mode of failure — shear or tensile + shear
[c]Mode of failure — compression
[d]Mode of failure — tensile In addition to these shear values, flexural strengths of the BORSIC reinforced linear PPQ composite (Composite C) were also used as a means of identifying suitable postcure conditions. These data are listed in the following Table III.

TABLE III

FLEXURAL STRENGTHS OF BORSIC REINFORCED LINEAR PPQ COMPOSITES[a]

Flexural Strength, ksi[b]/Modulus, psi × $10^6$

| Fabricated Condition | RT | 700°F |
| --- | --- | --- |
| as molded | 201.5/32.2 | 67.5/— |
| POSTCURED 24 hrs, 850°F argon | 157— | 73.5/— |
| postcured 48 hrs, 850°F argon | 179/29.4 | 137/27.4 |
| postcured 72 hrs, 850°F argon | 89.5/30.7 | 106/33 |

[a]Composite properties: fiber content, 55 v/o; void content, 0.5 v/o; density, 2.09 g/cc
[b]Flexural test: 3 point bend, S/D = 32/1

The results of this test indicate, as did the shear strength results of Table II above, that a postcure at 850°F for a minimum of 48 hours is required to stabilize the PPQ system.

In order to determine the potential of PPQ resin composites for structural applications involving temperatures in the 650°–750°F range, weight loss measurements at 650° and 700°F were carried out and the results compared to two polyimide systems. Monsanto's polyimide Skybond 709/700 and Ciba-Geigy's polyimide P13N, both reinforced with 62 and 52 volume percent respectively, of high modulus graphite (HMG-50) and the 709/700 reinforced with 62 volume percent BORSIC fiber were used as control materials for making the comparisons. The 709 has been shown to maintain good strengths at 700°F for 100 hours in static air while the P13N has been shown to be the least oxidatively stable of the polyimide family. The 650°F tests were conducted in a forced draft oven having 200 cubic feet per minute air circulation. The 700°F tests were done in a tube furnace using an airflow of 100 cc per minute. The results of the tests are shown graphically in FIGS. 1 and 2.

Figure 1:
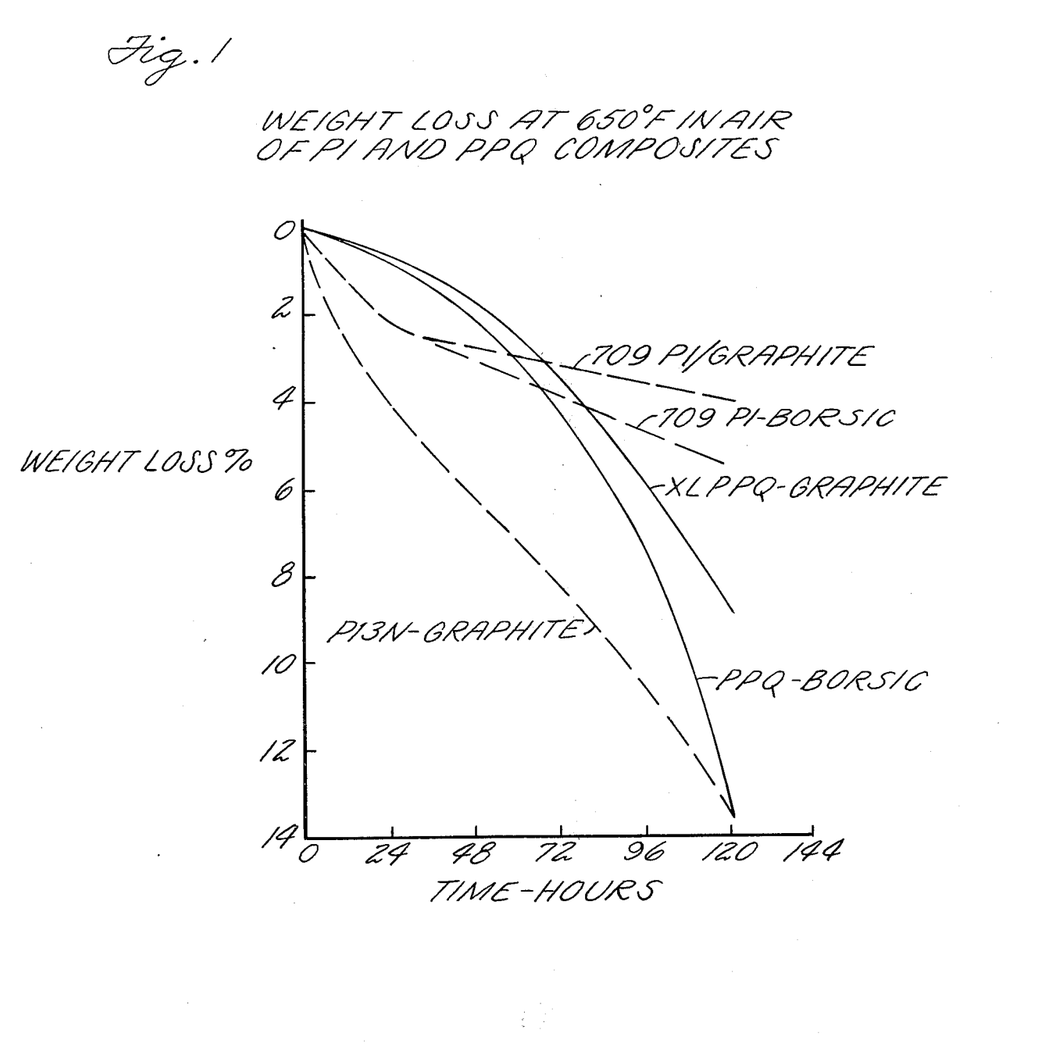
FIGS. 1 and 2 are graphs illustrating the comparative results of weight loss at 650°F in air of various polyimide composites with unmodified polyphenylquinoxaline composites.

The weight loss curve shown in FIG. 1 clearly demonstrates an improvement in oxidative stability of PPQ systems over the P13N-type polyimide at 650°F for 100 hours. The two PPQ composites, cross-linked PPQ-Modmor-II (Composite A) and linear PPQ-BORSIC (Composite C), show less weight loss than Skybond 709 systems up to 72 hours. However, the 709 polyimide has a slower rate of oxidation after extended exposures. The results also indicate that graphite reinforced composites may exhibit better oxidative stability in terms of weight loss than BORSIC or boron-reinforced systems. This may reflect the effect of a monofilament versus a yarn bundle on oxygen permeability within the composite.

Figure 2:
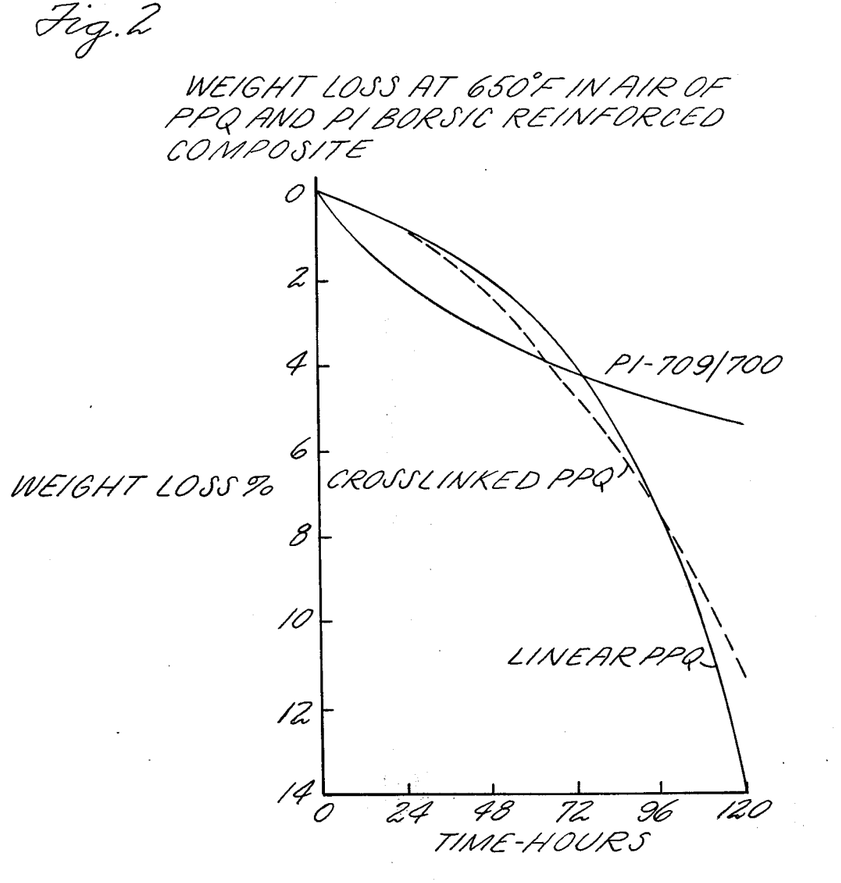

The comparison in oxidative weight loss at 650°F between BORSIC reinforced linear PPQ (Composite C) and cross-linked PPQ (Composite B) is shown in FIG. 2. Up to 96 hours the linear and cross-linked systems show essentially the same weight loss (approximately seven weight percent). For longer periods, however, the cross-linked version is somewhat more stable, as would be expected. Both systems after 72 hours were inferior to the Skybond 709-BORSIC composite. These results show that cross-linking by the addition of trifunctional monomers to linear PPQ does eliminate the thermoplastic character of the PPQ resin and the need to postcure but does not increase the oxidative stability to a sufficient level to warrent selection over the polyimide systems.

To achieve the desired type of cross-linking in a thermoplastic resin system such as PPQ, two conditions must prevail. First, chemical groups must be present in the resin which are oxidizable to hydroperoxide or peroxides which subsequently form free radicals. Secondly, the free radicals so formed must be capable of combining to form oxidatively stable linkages with the resin backbone, the reinforcing fiber, or with an added filler. The preferred mode of cross-linking is one which leads to uniform, regularly spaced linkages of sufficient density to eliminate thermoplasticity but not cause excessive brittleness. The chemical method which has been used does not achieve oxidatively stable cross-linking and, consequently, even though thermoplasticity is reduced, improvement in oxidative stability is not achieved.

It is known that Skybond polyimide 709 and 710 resins show improved oxidative stability over Skybond 703 and 700 resins due, in part, to silica filler material which is added primarily for resin flow control during molding. The silica apparently aids in reinforcement and cross-linking to achieve the increase in stability. Both resins have groups capable of free radical formation which may interact either with silica or the linear polyimide polymer.

Figure 3:
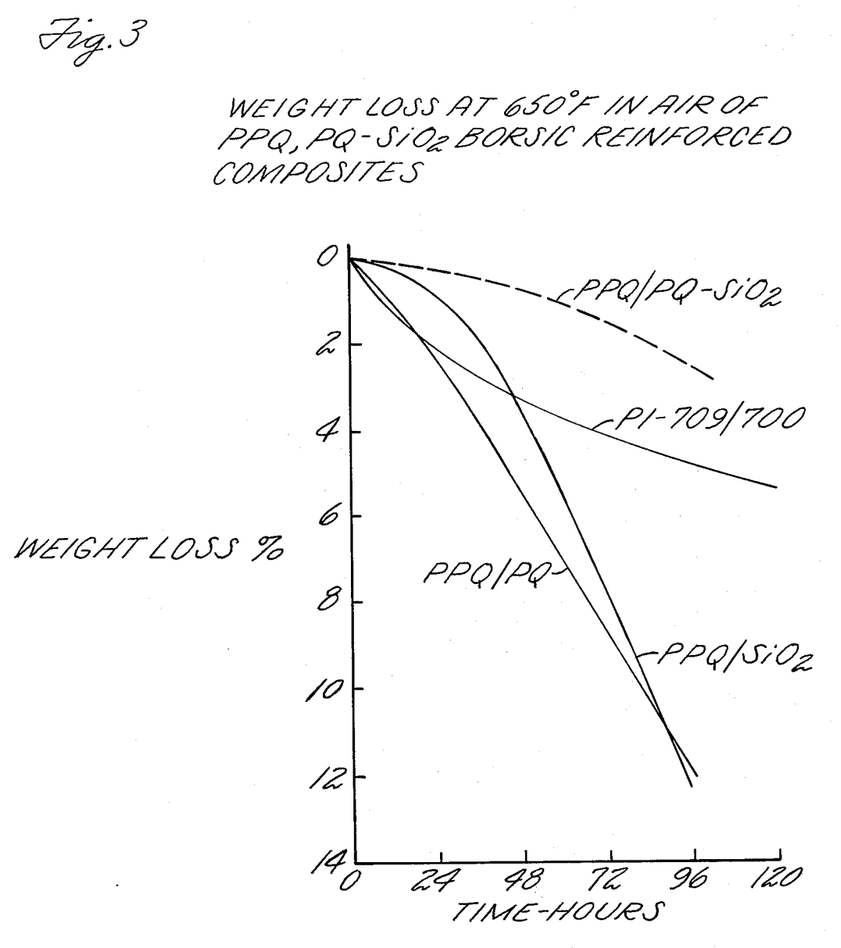
FIG. 3 is a graph illustrating the comparative results of weight loss at 650°F in air of various modifications of polyphenylquinoxaline composites with a polyimide composite.

To determine the effect of silica on linear PPQ resins, a BORSIC-reinforced prepreg tape was prepared using resin containing seven weight percent Cab-o-Sil (fume silica from Cabot Corp.). Three composites were fabricated as hereinabove described and resulted in laminates having the physical properties shown in Table IV below. Weight loss measurements at 650°F showed that the addition of silica filler did not improve the stability of linear PPQ as seen in FIG. 3. After 96 hours, the weight loss was 11.7 weight percent compared to seven weight percent for linear or cross-linked PPQ containing no silica. This effect is apparently due to the low degree of reactivity of any free radical species formed toward silica.

In order to introduce an oxidatively active group into the resin system, the addition of polyquinoxaline (PQ) to PPQ was investigated. The PQ resin contains reactive hydrogen atoms capable of combining with oxygen and forming active free radicals. A BORSIC-reinforced prepreg tape was prepared using a resin consisting of 80 weight percent linear PPQ and 20 weight percent PQ. Fabrication of the composite using the procedure described above resulted in a laminate having physical properties listed below in Table IV. Again, weight loss measurements at 650°F showed no improvement in stability over linear PPQ as also shown in FIG. 3. Presumably the active free radicals formed on oxidation of the PQ cannot react with the PPQ polymer to form effective cross-links.

Upon further investigation, wherein seven weight percent silica was added to a PPQ/PQ 80:20 resin system and a BORSIC prepreg tape was formulated into composite form as with the previously tested systems, the resulting composite displayed physical properties listed in the following Table IV.

Table IV

PHYSICAL PROPERTIES OF PQ AND SiO₂ MODIFIED
PPQ-BORSIC REINFORCED COMPOSITES

| Property | PPQ-SiO₂ | | Resin PPQ/PQ | PPQ/PQ-SiO₂ |
|---|---|---|---|---|
| Fiber, v/o | 55.05 | 54.16 | 58.97 | 57.53 | 58.2 |
| Resin, v/o | 40.7 | 39.9 | 34.23 | 32.78 | 30.5 |
| Glass, v/o | 5.4 | 6.34 | 6.40 | 6.64 | 8.94 |
| Void, v/o | −1.1 | −0.46 | 0.38 | 3.05 | 2.36 |
| Density | 2.09 | 2.08 | 2.14 | 2.09 | 2.14 |

As shown in FIG. 3, the PPQ/PQ-SiO₂ system exhibited surprising and dramatically improved oxidative stability. In fact, it showed a fourfold improvement over the PPQ/PQ and PPQ/SiO₂ systems and a twofold improvement over the polyimide 709 type system.

Variations in PQ and PPQ ratios were formulated to determine the effect on oxidative properties of the linear PPQ resin. The physical properties of these composites as well as additional 80:20 PPQ/PQ-SiO₂ composites is shown in the following Table V.

Table V

PHYSICAL PROPERTIES OF PPQ/PQ-7 WT % SiO₂-BORSIC
REINFORCED COMPOSITES

| Property | PPQ/PQ 80:20 | PPQ/PQ 80:20 | Resin PPQ/PQ 90:10 | PPQ/PQ 65:35 |
|---|---|---|---|---|
| Fiber, v/o | 56.6 | 56.5 | 57.7 | 56.5 |
| Resin, v/o | 35.4 | 33.1 | 28.9 | 28.8 |
| Glass + SiO₂, v/o | 6.9 | 9.5 | 10.56 | 11.3 |
| Void, v/o | 1.0 | 0.9 | 2.84 | 3.4 |
| Density, g/cc | 2.11 | 2.14 | 2.13 | 2.14 |

Figure 4:
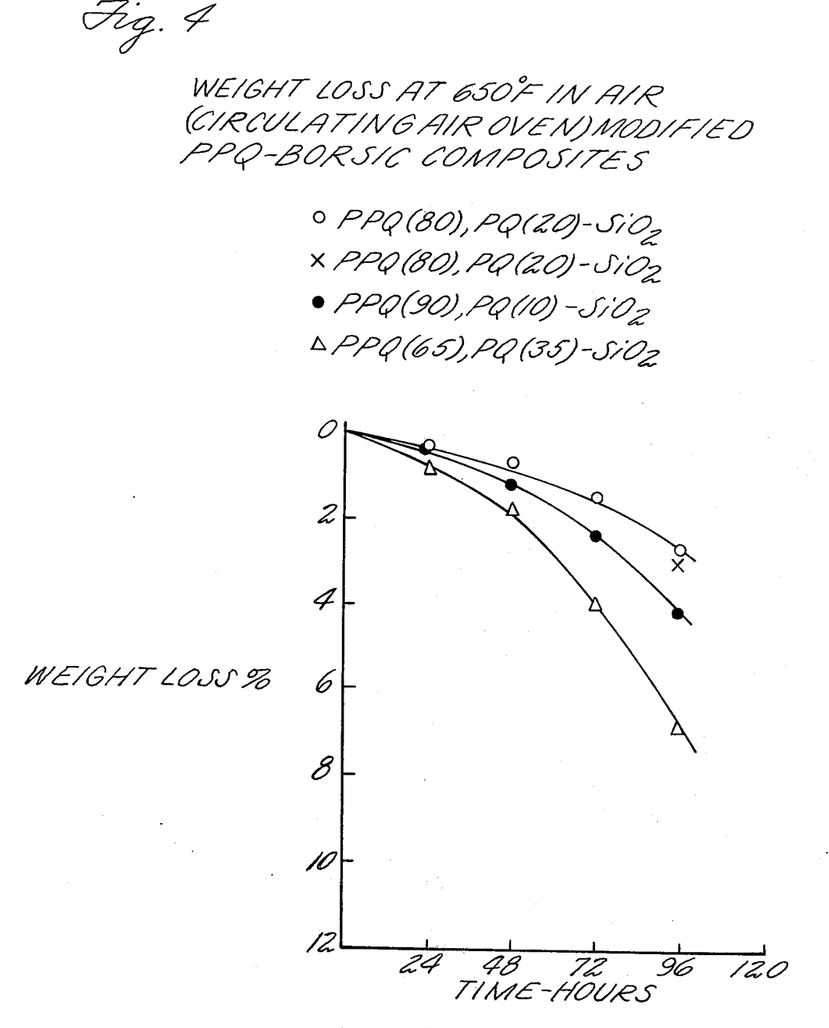
FIG. 4 is a graph illustrating the comparative results of weight loss at 650°F in air of various composites made utilizing modified polyphenylquinoxaline resins of the present invention.

As shown in FIG. 4, oxidative weight loss measurements at 650°F in a circulating oven (200 cubic feet per minute of air) indicated that the PPQ/PQ 80:20 system had the highest degree of stability with an average of 2.75 weight percent loss in 96 hours. For a corresponding time, the 90:10 system lost four weight percent and the 65:35 matrix composite lost 6.8 weight percent. The reproducibility of the 80:20 composite in terms of weight loss was excellent.

Figure 5:
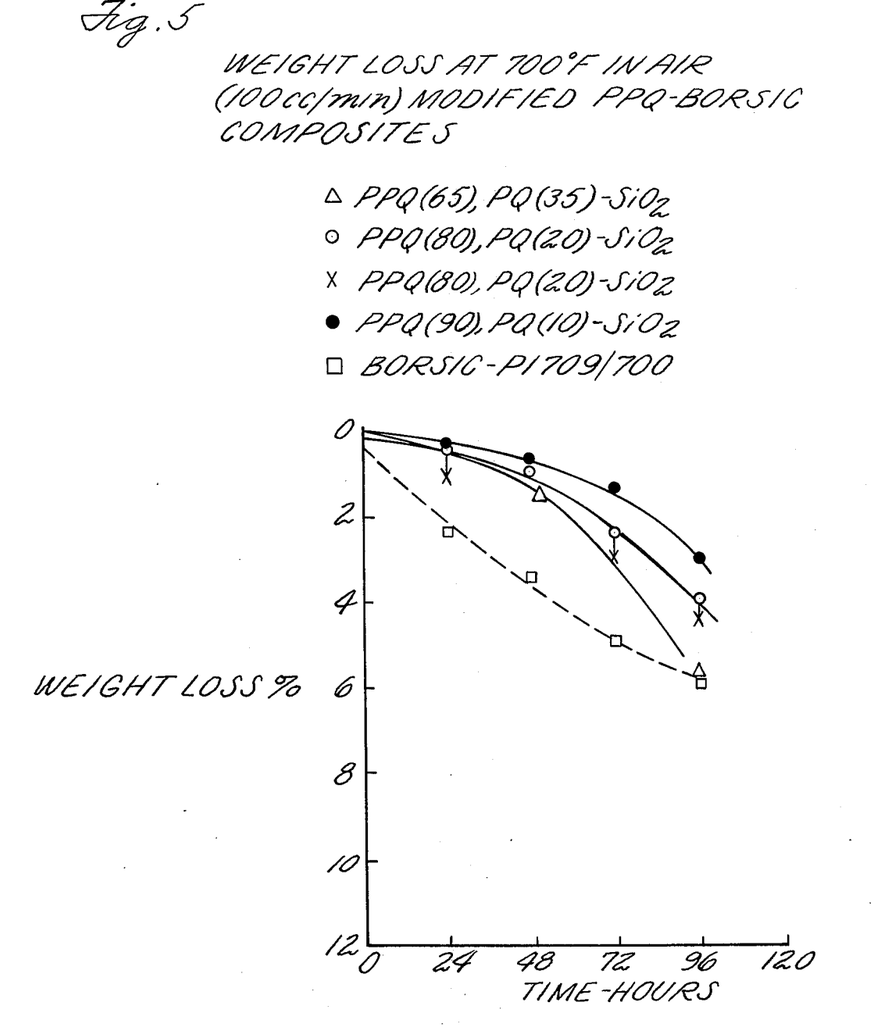
FIG. 5 is a graph illustrating the comparative results of weight loss at 700°F in air of various composites utilizing modified polyphenylquinoxaline resins of the present invention with a composite utilizing a polyimide resin.

As shown in FIG. 5, similar measurements at 700°F in a tube furnace using an airflow of 100 cc/min showed that the PPQ/PQ 90:10 system lost only three weight percent in 96 hours, compared to the 80:20 system which lost an average of 4.2 weight percent in the same period. Although imperfectly understood at the present time, the reversal in stability of the two PPQ/PQ systems between 650° and 700°F is likely related to the amount of air or oxygen required to achieve the required degree of cross-linking to prevent resin loss by decomposition and volatilization.

In order to assess the potential of the modified PPQ resins, short beam shear and flexural strengths were determined after aging in air at 650°F and 700°F for up to 100 hour time periods. The results indicated excellent strength retention at the elevated temperatures.

What has been set forth above is intended primarily as exemplary to enable those skilled in the art in the practice of the invention and it should therefore be understood that, within the scope of the appended claims, the invention may be practiced in other ways than as specifically described.

I claim:

1. An oxidatively stable resin consisting essentially of the cyclized reaction product of polyphenylquinoxaline polymer and polyquinoxaline polymer containing 1–10%, by weight, of a dispersed finely divided particulate filler selected from the group consisting of silica, alumina and graphite, the weight ratio of polyphenylquinoxaline polymer to polyquinoxaline polymer ranging from approximately 1.9 to 19.

2. The invention of claim 1 wherein said filler has a surface area of approximately 100–350 m²/gm (BET) and a particle size of 2–20 mµ.

3. The invention of claim 1 wherein said filler is 3–7%, by weight, fume silica and the weight ratio of polyphenylquinoxaline polymer to polyquinoxaline polymer ranges from approximately 4 to 9.

4. The invention of claim 3 wherein a plurality of high strength filaments are embedded in said resin.

5. The invention of claim 4 wherein said silica has a surface area of approximately 225–250 m²/gm (BET) and a particle size of 7–12 mµ.

6. A polymer suitable for conversion to an oxidatively stable resin consisting essentially of the reaction product of (a) at least one aromatic bis o-diamine selected from the group consisting of 2,3,7,8-tetra aminophenazine, 3,3'-diaminobenzidine, 3,3',4,4'-tetra aminobenzophenone, 3,3',4,4'-tetra aminodiphenylsulfone, 3,3',4,4'-tetra aminodiphenylmethane, 3,3',4,4'-tetra aminodiphenyl ether, 2,3,5,6-tetra aminobenzene and 2,3,7,8-tetra aminobenzofuran, (b) at least one aromatic bis glyoxal selected from the group consisting of p,p'-oxybis phenyleneglyoxal, p,p'-phenylene diglyoxal, p,p'-diphenyletherdiglyoxal, p,p'-diphenylsulfidediglyoxal and p,p'-diphenylsulfonediglyoxal, (c) at least one bis phenyl-α-dicarbonyl selected from the group consisting of 1,4-bisphenylglyoxalyl benzene, 1,3-bisphenylglyoxalyl benzene, 4,4'-oxydibenzil, 4,4'-dibenzilsulfide and 4,4'-dibenzilsulfone and (d) 1–10%, by weight, of a dispersed, finely divided filler selected from the group consisting of silica, alumina and graphite, the amount of aromatic bis o-diamine being essentially equimolar with respect to the total amount of aromatic bis glyoxal and bis phenyl-α-dicarbonyl.

7. The invention of claim 6 wherein said filler has a surface area of approximately 100–350 m²/gm (BET) and a particle size of 2–20 mµ.

8. The invention of claim 6 wherein said reaction product contains 3–7%, by weight, fume silica.

9. The invention of claim 8 wherein a plurality of high strength filaments are embedded in said polymer.

10. The invention of claim 9 wherein said silica has a surface area of approximately 225–250 m²/gm (BET) and a particle size of 7–12 mµ.

* * * * *